(12) United States Patent
Varner et al.

(10) Patent No.: US 12,279,613 B2
(45) Date of Patent: Apr. 22, 2025

(54) ATTRACTANT BLEND COMPOSITIONS, DEVICES AND METHODS FOR ATTRACTING FEMALE MICE

(71) Applicants: Elana Varner, Holliston, MA (US); Regine Gries, Coquitlam (CA); Gerhard Gries, Coquitlam (CA)

(72) Inventors: Elana Varner, Holliston, MA (US); Regine Gries, Coquitlam (CA); Gerhard Gries, Coquitlam (CA)

( * ) Notice: Subject to any disclaimer, the term of this patent is extended or adjusted under 35 U.S.C. 154(b) by 0 days.

(21) Appl. No.: 17/403,695

(22) Filed: Aug. 16, 2021

(65) Prior Publication Data

US 2022/0046917 A1 Feb. 17, 2022

Related U.S. Application Data

(60) Provisional application No. 63/066,716, filed on Aug. 17, 2020.

(51) Int. Cl.
| | | |
|---|---|---|
| *A01N 25/00* | (2006.01) | |
| *A01N 25/08* | (2006.01) | |
| *A01N 31/02* | (2006.01) | |
| *A01N 31/06* | (2006.01) | |
| *A01N 33/18* | (2006.01) | |
| *A01N 35/02* | (2006.01) | |
| *A01N 35/06* | (2006.01) | |
| *A01N 43/16* | (2006.01) | |
| *A01N 43/18* | (2006.01) | |
| *A01N 43/78* | (2006.01) | |
| *A01N 43/90* | (2006.01) | |
| *A01N 45/00* | (2006.01) | |

(Continued)

(52) U.S. Cl.
CPC ........... *A01N 31/02* (2013.01); *A01N 25/004* (2013.01); *A01N 25/08* (2013.01); *A01N 31/06* (2013.01); *A01N 33/18* (2013.01); *A01N 35/02* (2013.01); *A01N 35/06* (2013.01); *A01N 43/16* (2013.01); *A01N 43/18* (2013.01); *A01N 43/78* (2013.01); *A01N 43/90* (2013.01); *A01N 45/00* (2013.01); *A01N 59/26* (2013.01); *A01P 19/00* (2021.08)

(58) Field of Classification Search
CPC ...... A01N 31/02; A01N 25/004; A01N 25/08; A01N 31/06; A01N 33/18; A01N 35/02; A01N 35/06; A01N 43/16; A01N 43/18; A01N 43/78; A01N 43/90; A01N 45/00; A01N 59/26; A01N 41/12; A01P 19/00
See application file for complete search history.

(56) References Cited

U.S. PATENT DOCUMENTS

2019/0183126 A1* 6/2019 Gries .................. A01N 25/004

OTHER PUBLICATIONS

Varner et al., Identification and Field Testing of Volatile Components in the Sex Attractant Pheromone Blend of Female House Mice, Nov. 2018, Journal of Chemical Ecology, 10 pages. (Year: 2018).*

* cited by examiner

*Primary Examiner* — Trevor Love
(74) *Attorney, Agent, or Firm* — Frost Brown Todd LLP

(57) ABSTRACT

Attractant blend compositions attractive to female mice include one or more pheromone components comprising one or more of 2,3,5-trithiahexane, 1-hexanol, and 3-methyl-2-pentanone; and one or more known attractants. The known attractants can include 3,4-dehydro-exo-brevicomin ("brevicomin"), 2-sec-butyl-4,5-dihydrothiazole ("thiazole"), and (Continued)

testosterone. Devices and methods of using the attractant blend compositions are also disclosed.

19 Claims, 8 Drawing Sheets

(51) Int. Cl.
*A01N 59/26* (2006.01)
*A01P 19/00* (2006.01)

ATTRACTANT BLEND COMPOSITIONS, DEVICES AND METHODS FOR ATTRACTING FEMALE MICE

CROSS-REFERENCE TO RELATED APPLICATIONS

The present application claims the priority benefit of U.S. Provisional Patent App. Ser. No. 63/066,716, filed Aug. 17, 2020, which is incorporated herein by reference.

TECHNICAL FIELD

The present disclosure generally relates to attractant blend compositions, devices, and methods for attracting female mice.

BACKGROUND

Mice are global pests. They cause damage by soiling food, spreading allergens, diminishing yields of agricultural crops, serving as reservoirs for disease-causing pathogens, endangering island seabird colonies, and by acting as an invasive species harming indigenous fauna (Wanless et al. 2007, Angel et al. 2009). These many adverse effects have prompted ongoing efforts to trap and poison mice. However, mice can exhibit neophobia (the fear of new objects) (Brigham & Sibley 1999). The lag time for neophobic rodents to become conditioned to the presence of newly placed traps, or trap boxes containing snap traps, and to enter them greatly reduces the effectiveness of mouse control efforts.

SUMMARY

According to one embodiment, an attractant blend composition for attracting female mice includes one or more pheromone components and one or more female mouse attractants. The one or more pheromone components include 2,3,5-trithiahexane, 1-hexanol, and 3-methyl-2-pentanone. The one or more female mouse attractants include 3,4-dehydro-exo-7-ethyl-5-methyl-6,8-dioxabicyclo[3.2.1]octane ("brevicomin"), 2-sec-butyl-4,5-dihydrothiazole ("thiazole"), and testosterone. The one or more pheromone components and the one or more female mouse attractants are isolated, synthetic, or purified.

According to another embodiment, a method of attracting a female mouse includes providing a composition including one or more pheromone components and one or more female mouse attractants. The one or more pheromone components include 2,3,5-trithiahexane, 1-hexanol, and 3-methyl-2-pentanone. The one or more female mouse attractants include 3,4-dehydro-exo-7-ethyl-5-methyl-6,8-dioxabicyclo[3.2.1]octane ("brevicomin"), 2-sec-butyl-4,5-dihydrothiazole ("thiazole"), and testosterone. The one or more pheromone components and the one or more female mouse attractants are isolated, synthetic, or purified.

According to another embodiment, a device for attracting a female mouse includes a housing or a trap, an attractant blend composition including one or more pheromone components and one or more female mouse attractants. The one or more pheromone components include 2,3,5-trithiahexane, 1-hexanol, and 3-methyl-2-pentanone. The one or more female mouse attractants include 3,4-dehydro-exo-7-ethyl-5-methyl-6,8-dioxabicyclo[3.2.1]octane ("brevicomin"), 2-sec-butyl-4,5-dihydrothiazole ("thiazole"), and testosterone. The one or more pheromone components and the one or more female mouse attractants are isolated, synthetic, or purified. The attractant blend composition is adjacent to, or included within, the housing or the trap.

DETAILED DESCRIPTION

Figure 1:
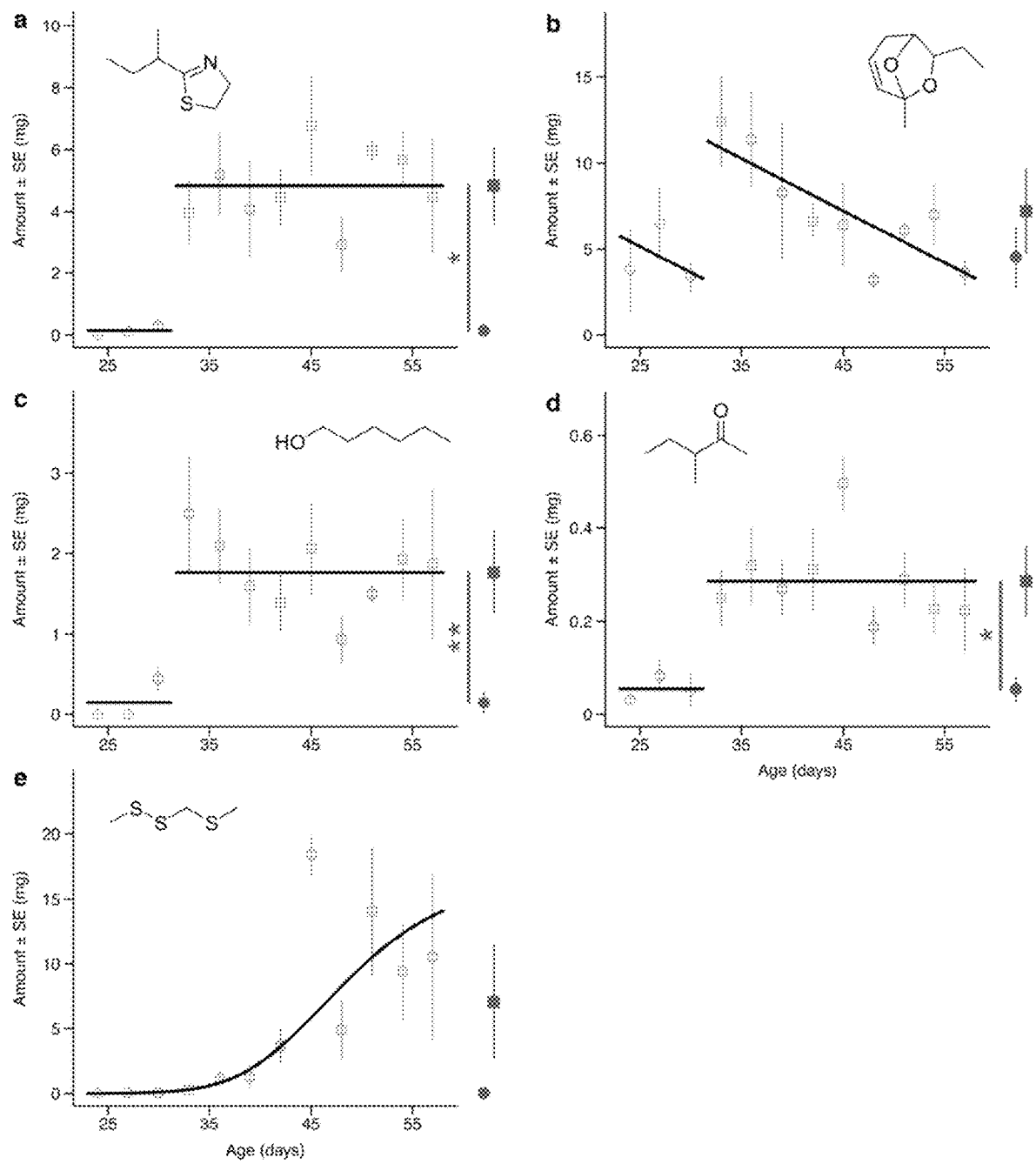
FIG. 1 depicts a series of graphs showing the relative change in abundance of sex pheromone components of male mice as they progressed from juveniles to adolescents. Graph A depicts the change of 2-sec-butyl-4,5-dihydrothiazole ("thiazole"); Graph B depicts the change of 3,4-dehydro-exo-7-ethyl-5-methyl-6,8-dioxabicyclo[3.2.1]octane ("brevicomin"); Graph C depicts the change of 1-hexanol; Graph D depicts the change of 3-methyl-2-penatone; and Graph E depicts the change of 2,3,5-trithiahexane.

The term "odorants" as used herein refers to chemicals which rapidly emanate from a source and are readily sensed by a mouse distant to the source.

The term "isolated" as used herein means separated from materials with which the compound is normally associated in a native state.

The term "purified" as used herein refers to material that has been isolated under conditions that reduce, or eliminate, the presence of unrelated materials, i.e., contaminants, including native materials from which the material is obtained. Purified materials, substantially free of contaminants, can be 50% or more pure; 90% or more pure, or 99% or more pure. Purity can be evaluated by methods known in the art.

The term "synthetic" as used herein means artificially produced by chemical processes or other processes initiated by human energy, as opposed to compounds formed by natural processes.

The term "lethal" as used herein means sufficient to result in immobilization, knockdown and/or death of 50% or more, 55% or more, 60% or more, 65% or more, 70% or more, 75% or more, 80% or more, 85% or more, 90% or more, 95% or more, or 99% or more, mice.

The term "lethal agent" as used herein means an agent that is capable of immobilizing, knocking down, and/or killing 50% or more, 55% or more, 60% or more, 65% or more, 70% or more, 75% or more, 80% or more, 85% or more, 90% or more, 95% or more, or 99% or more, mice that are exposed to, or have ingested, an appropriate dose of the lethal agents over an appropriate amount of time.

The term "chemosterilant" as used herein means a substance that is capable of sterilizing 50% or more, 55% or more, 60% or more, 65% or more, 70% or more, 75% or more, 80% or more, 85% or more, 90% or more, 95% or more, or 99% or more, mice that are exposed to, or have ingested, an appropriate dose of the substance over an appropriate amount of time.

The term "mouse" as used herein refers to at least one mouse species of the genus *Mus*, including the house mouse (*Mus musculus*).

The terms "attractant" and "attractant blend" as used herein refer to any compositions or formulations that makes attractive to a mouse or mice, a habitat, food source or other site which may be frequented or traversed by a mouse or mice. In certain embodiments, the compositions or formulations of an attractant can be pheromone components.

The present disclosure generally relates to attractant blends for attracting one or more female mice. Generally, the attractant blends can include one or more attractants, including, for example, Candidate Pheromone Components ("CPCs"), that can synergistically enhance the attraction of female mice to known attractants. The present CPCs were identified by examining the headspace odorants of soiled bedding of male mice and identifying components that increased in relative abundance as the male mice progressed from juveniles to adults. In certain embodiments, the CPCs described herein can include one or more of 2,3,5-trithiahexane, 1-hexanol, and 3-methyl-2-pentanone. In certain embodiments, the attractant blend compositions described herein can include one, two, or three of the CPCs. The CPCs can be isolated, purified, and/or synthetic in various embodiments.

Without being bound by theory, it is theorized that the combination of CPCs with known attractants can form an attractant blend that can convey a more comprehensive and authentic "male mouse scent" (e.g., indicative of the presence of a male) and/or the male mouse sex pheromone, than similar attractant blends including only previously known attractants. In certain embodiments, the known attractants can be sex attractant pheromone components. As can be appreciated, "sex attractant pheromone component" can mean an attractant that is produced by an organism and has attractive properties.

As can be appreciated, sexual maturity is an important trait for female mice and can be broadcast by male mice using sex pheromone components. Examples of known male sex pheromone components that can act as attractants include 3,4-dehydro-exo-7-ethyl-5-methyl-6,8-dioxabicyclo [3.2.1]octane ("brevicomin) and 2-sec-butyl-4,5-dihydrothiazole ("thiazole").

Brevicomin and thiazole were previously identified as sex attractant pheromone components that convey male sexual maturity to female mice in U.S. Patent App. Pub. No. 2019/0335740, which is incorporated herein by reference.

Testosterone is believed to convey both sexual maturity and health because testosterone titers in urine deposits of rodents increase with sexual maturation, because the biosynthesis of sex attractant pheromone components such as thiazole is testosterone-dependent, and because the level of testosterone in urine markings of healthy rodent males is significantly higher than that of diseased males.

The present disclosure describes the discovery that the attractiveness of known sex attractant pheromone components (brevicomin, thiazole, and testosterone) can be enhanced by the inclusion of CPCs (1-hexanol, 3-methyl-2-pentanone and 2,3,5-trithiahexane). In certain embodiments, the attractiveness of known sex attractant pheromone components can be enhanced by inclusion of 1-hexanol and 2,3,5-trithiahexane. In certain embodiments, attractant blends including the CPCs can attract more female mice than similar, or identical, attractant blends free of the CPCs. It has been further discovered that certain combinations of attractants can be more effective than other combinations. For example, combination of the CPCs with only testosterone was found not to be more effective than the use of testosterone alone as an attractant. This unpredictable result suggests that female mouse attraction is complicated and relies on sensing multiple interacting pheromone components.

Although brevicomin, thiazole, and testosterone are referred to as the known sex attractant pheromone components in the present disclosure, it should be appreciated that other known attractants can also be suitable for use with the CPCs in other embodiments.

The attractant blends described herein can be singular compositions or formed of multiple compositions in various embodiments. For example, in certain embodiments, all of the components of the described attractant blends can be dissolved in a suitable liquid or solvent such as mineral oil in a single vial. Alternatively, in other embodiments, the attractant blends can emanate from multiple sources. For example, certain attractant blends as used herein can include the CPCs in a first mineral oil vial and other known attractants (e.g., brevicomin and thiazole) in a second mineral oil vial. In certain embodiments, testosterone can also, or alternatively, be dissolved in ether or acetonitrile and can emanate from an infused filter paper. The use of multiple vials and/or infused filter papers can be useful for a variety of reasons including improved designs of a mouse attracting device, for improved dispersion or dispersion characteristics of the components, and/or for easier replacement of the components.

In certain embodiments, each of the components of the attractant blend described herein can be included in amounts where the attractant blend substantially emanates each of the components at amounts similar to those emanating from bedding soiled by a male mouse in a predetermined period of time. For example, in certain embodiments, the CPCs can be included in an attractant blend including about 0.3 mg of 3-methyl-2-pentanone, about 0.3 mg of 1-hexanol, and about 50 mg of 2,3,5-trithiahexane in about 100 ml of mineral oil to match the pheromone blend that emanates from soiled bedding of a male mouse over 24 hours. In certain embodiments, the attractant blends described herein can alternatively include the one or more CPCs in amounts such that the blends emanate each of the CPCs in amounts substantially similar to the amounts emanating from soiled bedding of one or more male mice over other time periods. For example, certain blends can emanate each of the CPCs in amounts substantially similar to the amounts emanating from soiled bedding of two or more male mice over 48 hours in certain embodiments. In certain embodiments, the attractant compositions can include about 750 ng of testosterone dissolved in about 50 µl of ether or acetonitrile, and about 1 mg of brevicomin and about 1 mg of thiazole dissolved in 10 ml of mineral oil to match the pheromone blend that emanates from soiled bedding of a male mouse over 24 hours.

In certain embodiments, the attractant blends described herein can include about 0.1 mg to about 1.5 mg of 3-methyl-2-pentanone, about 0.1 mg to about 1.5 mg of 1-hexanol, about 5 mg to about 500 mg of 2,3,5-trithiahexane, about 0.1 mg to about 5 mg of brevicomin, about 0.1 mg to about 5 mg of thiazole, and about 50 ng to about 2.5 mg of testosterone, each, if present, dissolved in an appropriate amount of suitable solvent (mineral oil, ether, or acetonitrile).

As can be appreciated, larger amounts of the components can emulate the presence of two or more male mice or the sustained presence of one male mouse, for example. However, excessive amounts of the components may be ineffective if the components emanate in quantities substantially different from those associated with multiple wild male mice or in quantities that would be unattractive to a female mouse.

In certain embodiments, the attractant blends described herein can further include other components such as one or more lethal agents, chemosterilants, flavorings, colorants, bittering agents, and preservatives. For example, natural or artificial flavorings such as milk flavor and sodium chloride can be included in certain embodiments. As can appreciated, sodium chloride can act as both a flavoring and as a preservative. Embodiments including additional components can be useful for various applications such as the use of the attractant blends described herein as a mouse lure.

In embodiments where the attractant blends include a lethal agent, the lethal agent can be a chemical that is capable of causing immobilization and/or death of one or more mice. For example, the chemical can be one or more of an anticoagulant and/or a toxicant. In certain embodiments, examples of suitable lethal agents can include warfarin ((RS)-4-hydroxy-3-(3-oxo-1-phenylbutyl)-2H-chromen-2-one), chlorophacinone (2-[2-(4-chlorophenyl)-1-oxo-2-phenylethyl]indane-1,3-dione), diphacinone (2-(diphenylacetyl)-1H-indene-1,3(2H)-dione), bromadiolone (3-[3-[4-(4-bromophenyl)phenyl]-3-hydroxy-1-phenylpropyl]-2-hydroxychromen-4-one), difethialone (3-[3-[4-(4-bromophenyl)phenyl]-1-tetralinyl]-2-hydroxy-4-thiochromenone), brodifacoum (3-[3-[4-(4-bromophenyl)phenyl]-1,2,3,4-tetrahydronaphthalen-1-yl]-2-hydroxychromen-4-one), and combinations thereof. In certain embodiments, suitable toxicants can include bromethalin (N-methyl-2,4-dinitro-6-(trifluoromethyl)-N-(2',4',6'-tribromophenyl)aniline), cholecalciferol ((3β,5Z,7E)-9,10-secocholesta-5,7,10(19)-trien-3-ol), zinc phosphide (zinc phosphide/trizinc diphosphide), strychnine (strychnidin-10-one), alphachloralose, and combinations thereof.

In embodiments where the attractant blends include a chemosterilant, the chemosterilant can be a chemical that is capable of sterilizing one or more mice. For example, suitable chemosterilant chemicals can generally be compounds that can sterilize female mice as known in the art. Female chemosterilants can be desired due to the attraction of female mice to attractant blends described herein.

In certain embodiments, the described attractant blends can further include a food lure.

Suitable food bait can include natural foodstuffs such as meat, cheese, eggs, nuts, bacon and/or grains. For example, a food bait lure can include lard and cracklings, cereal flour (e.g., oat flour and/or rice flour), cereal bran (e.g., wheat bran), gelling agent(s) (e.g., gelatin and/or agar), sugar (e.g., fructose), oil(s) (e.g., safflower oil), emulsifier(s) (e.g., soy lecithin) and humectant(s) (e.g., carrageenan gum powder), water, chemical attractants (e.g., 2-hydroxy-3-methylcyclopent-2-en-1-one, 2,3-butadiene, 3-methylbutanal, 5-methyl-(E)-2-hepten-4-one, 5-methyl-4-heptanone, γ-octalactone and/or butyric acid), and combinations thereof. In certain embodiments, the food bait can include synthetic food odorants. Examples of food baits with synthetic food odorants are disclosed in U.S. Pat. No. 9,936,694 which is hereby incorporated herein by reference. In other embodiments, the attractant blends described herein can be used in devices that have a separate food bait.

As can be appreciated, the attractant blends can also, or alternatively, include other components. For example, natural or artificial flavorings such as milk flavor and sodium chloride can be included in certain embodiments. In certain embodiments, preservatives can also be included. As can appreciated, sodium chloride can act as both a flavoring and a preservative.

In certain embodiments, bittering compounds, such as denatonium benzoate, can be included to make the attractant blends unpalatable to humans. As can be appreciated, it can also be useful to formulate the compositions with rheology modifiers, waxes, and the like to modify the consistency of the compositions described herein to facilitate their use.

In certain embodiments, the attractant blends can be colored through inclusion of a colorant. For example, dyes and pigments as known in the art can be used to color the attractant blend compositions. In certain embodiments, colorants can be used to color the compositions a color, such as red, that provides visual warning to humans that the composition contains a potentially harmful substance such as a lethal agent. In certain embodiments, colorants can alternatively color a composition to a natural color.

In certain embodiments, an attractant blend can include one or more known attractants such as brevicomin, thiazole, and testosterone and one or more CPCs such as 2,3,5-trithiahexane, 1-hexanol, and 3-methyl-2-pentanone, each in an amount of about 0.01% to about 99%, by weight. For example, each of the one or more known attractants and the CPCs can be included in an amount of about 0.01% or more, about 0.1% or more, about 1% or more, about 5% or more, about 10% or more, about 12.5% or more, about 15% or more, about 17.5% or more, about 20% or more, about 22.5% or more, about 25% or more, about 27.5% or more, about 30% or more, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more, by weight of the attractant blend.

In certain embodiments, the attractant blend can also include at least one lethal agent in an amount of about 1% to about 99%, by weight, of the attractant blend. The lethal agent can be a chemical that is capable of immobilizing or killing one or more mice. In certain embodiments, the lethal agent(s) can be included in an amount of about 1% or more, about 2% or more, about 5% or more, about 7.5% or more, about 10% or more, about 12.5% or more, about 15% or more, about 17.5% or more, about 20% or more, about 22.5% or more, about 25% or more, about 27.5% or more, about 30% or more, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more, by weight of the attractant blend.

In certain embodiments, the attractant blend can also, or alternatively, include one or more chemosterilants in an amount of about 1% to about 99% of the attractant blend. The chemosterilant(s) can be a chemical that is capable of sterilizing one or more mice. In certain embodiments, the chemosterilant(s) can be effective to sterilize female mice. In certain embodiments, the chemosterilant(s) can be included in an amount of about 1% or more, about 2% or more, about 5% or more, about 7.5% or more, about 10% or more, about 12.5% or more, about 15% or more, about 17.5% or more, about 20% or more, about 22.5% or more, about 25% or more, about 27.5% or more, about 30% or more, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more, by weight of the attractant blend.

In certain embodiments described herein, an attractant blend that attracts one or more mice can be formulated as a granule, a solid block, a gel, a powder, a paste, a liquid, an aerosolized composition, or as combinations thereof. As can be appreciated, the attractant blends described herein can be applied in any suitable manner. For example, the attractant blends can be applied as a solid, a semi-solid, a liquid, or an aerosol using appropriate devices.

As can be appreciated, any of the attractant blends described herein can be included in a device for attracting one or more mice. The device can include attractant blends including one or more known attractants and one or more CPCs. In certain embodiments, the attractant blends can also optionally include one or more of a lethal agent and a chemosterilant. In certain embodiments, the device can include a housing for receiving at least one mouse. The attractant blends can be adjacent to, or included, within the housing. The housing can also include a food lure that is adjacent to, or included within, the composition. The housing can allow a mouse to enter and leave the device after ingesting the composition. The housing can be configured so that a mouse can enter the device, but other animals are less likely to be able to enter the device. For example, the housing can contain a size-restrictive entryway, and the housing can optionally include a sharp turn. The device can be reusable (e.g., be rebaitable) or can be a single-use device.

The device can also include, or alternatively be, a trap. The trap can be an immobilizing trap (e.g., a sticky trap or a chamber trap), an impaling trap, a snap trap, an asphyxiation trap (e.g., a drowning trap, or a noose-based trap), an electrocution trap, a skull-fracturing piston trap, a catch-and-release trap, a self-resetting trap capable of multiple killings, or combinations thereof.

As can be appreciated, the device can trap, or kill, more than one mouse in certain embodiments. For example, a device for attracting one or more mice can include multiple single-use traps, a plurality of chambers that can each trap one mouse, or a single chamber that can trap or kill multiple mice in various embodiments.

Other variations to the device are also possible in certain embodiments. For example, a device can automatically kill and remove a mouse in certain examples. In such examples, a mouse can be lured into a trap housing that kills the mouse using, for example, an impaling trap, a compression trap, an asphyxiation trap, an electrocution trap, or a skull-fracturing piston trap. Once the mouse has been killed, the trap can reset itself releasing the mouse to fall out of both the trap housing and the device. As can be appreciated, such devices can kill multiple mice without human intervention. In certain embodiments, such devices can be mechanically powered (using e.g., a compressed gas cartridge or a compressed spring) or can be electrically powered.

As can be appreciated, other devices are also possible in certain embodiments. For example, in certain embodiments, a device for attracting mice can be a dispensing device or a dispersing device which dispenses, disseminates, emanates, and/or disperses, a composition as described herein using a device such as an aerosol device, a trigger sprayer device, a pump sprayer device, or the like. As can be appreciated, the attractant blends in such embodiments can be an aerosolized liquid or the like.

Any of the attractant blends described herein can be used to attract one or more mice. The one or more mice can be attracted by providing any of the attractant blends described herein. The one or more mice can also be immobilized and/or killed by providing any of the attractant blends described herein with a lethal agent. The one or more mice can also be sterilized by providing any of the attractant blends described herein together with a chemosterilant. The attractant blends can be provided in a dose that can be sufficient to result in the attraction, and optionally, the sterilization and/or immobilization and/or death of one or more mice.

In certain embodiments, the CPCs described herein can be provided as a separate and preformulated blend to an existing mouse attractant bait or device. In such embodiments, the existing bait or device can exhibit improved attractant qualities without requiring wholesale replacement or revision.

Examples

Source and Maintenance of the Mouse Colonies

For identification of long-range odorants produced by male house mice, house mice, *Mus musculus* (strain: CD-1®), were obtained from Charles River Laboratories Ltd (Saint-Constant, QC J5A 2E7, Canada) and cared for by Animal Care Services of Simon Fraser University ("SFU"). On arrival, mice were assigned to nine groups of five female mice each and nine groups of five male mice each. Each group was accommodated in cages (50 cm×40 cm×20 cm) lined with commercial corn cob bedding (Anderson's Bed o'Cobs, The Andersons Inc. Maumee, OH 43537, USA), provided with Nalgene toys, running wheels (Jamieson's Pet Food Distributers Ltd, Richmond, BC V4G 1C9, Canada), and provisioned with commercial rodent food (LabDiet® Certified Rodent Diet, LabDiet®, St Louis, MO 64144, USA) as well as water ad libitum. For Experiments 5-8, greater than 6-week-old female mice (strain: CD-57®) were purchased from Charles River Laboratories International Inc. (Saint-Constant, QC J5A 2E7, Canada) and housed in groups of four in the same type of cage and under the same conditions as described above. To make sure that each female was tested only once for her response to a specific test stimulus, the four females in each cage were individually marked by punching their left or right ear once or twice. Ear-punched mice were allowed to recover for one week prior to the onset of bioassays.

For Experiment 1, reproductively unexperienced adult female house mice, Mus musculus (strain: CD-57®), were obtained from the Christian-laboratory at Simon Fraser University ("SFU") and cared for by Animal Care Services of SFU. On arrival, mice were assigned to groups of four or five in cages (50×40×20 cm) lined with commercial corn cob bedding (Anderson's Bed o'Cobs, The Andersons Inc. Maumee, OH 43537, USA), provided with Nalgene toys, running wheels (Jamieson's Pet Food Distributers Ltd, Richmond, BC V4G 1C9, Canada), and provisioned with commercial rodent food (LabDiet® Certified Rodent Diet, LabDiet®, St Louis, MO 64144, USA) as well as water ad libitum. Cages were maintained at a temperature of 21° C. and a relative humidity of 50%. A reverse photoperiod (12 hours light; 12 hours dark) was maintained to facilitate behavioral bioassays.

Identification of Long-Range Odorants Produced by Male House Mice

The long-range odorants emanating from urine and feces deposits of male and female house mice were identified using the soiled bedding of male and female mice aging from 33 days to 56 days. As mice progressed from juveniles to adults, urine- and feces-soiled bedding from nine groups of five males each, and nine groups of five females each, were collected and replaced with fresh bedding at three-day intervals. The combined soiled bedding from each of three groups of males (450 g), and each of three groups of females (450 g), was placed into separate Pyrex glass chambers (30×15 cm) each connected to a Pyrex glass tube (15 cm×5 mm OD) filled with the adsorbent Porapak™ Q (200 mg) serving as an odorant trap. Charcoal-filtered air was drawn through each chamber and the Porapak™ Q odorant trap at a flow of 1 L per minute. After capturing urine and feces odorants on Porapak™ Q for 24 hours, odorants were desorbed with consecutive rinses of pentane (2 ml) and ether (2 ml). After adding dodecyl acetate as an internal standard, extracts were concentrated to 250 µl per sample.

Aliquots (2 µl) of each sample were analyzed using a gas chromatograph (GC) interfaced with a mass spectrometer (MS) ("GC-MS") (Varian Saturn Ion Trap GC-MS). The GC-MS was fitted with a DB-5 MS GC column (30 m×0.25 mm ID; Agilent Technologies Inc., Santa Clara, CA 95051, USA) using helium as the carrier gas (flow rate: 35 cm per second), and was run using the following temperature program: 40° C. for 5 min, 10° C. per min until 280° C. (5 min). The injector port was set at 250° C. and the ion trap at 200° C.

Odorants were identified by comparing their retention indices (relative to straight chain alkanes) and mass spectra with those of authentic standards purchased from suppliers or synthesized in the laboratory. Odorants that were either male-specific or increased in abundance as males progressed to sexual maturity were considered Candidate Pheromone Components or CPCs.

Table 1 depicts the odorants identified in the soiled bedding of female and male mice.

TABLE 1

| | Mean abundance (%) | |
|---|---|---|
| Compound | Female | Male |
| 2-pentanone | 0.18 | 0.4 |
| 3-methyl-3-buten-1-ol | 6.96 | 4.6 |
| 3-methyl-2-pentanone | 0.01 | 0.33 |
| 1-pentanol | 0.27 | 0.35 |
| 3-methyl-2-buten-1-ol | 0.20 | 0.42 |
| butyric acid | 29.74 | 0.0 |
| unknown | 0.37 | 2.25 |
| 3-methylbutyric acid | 3.30 | 0.0 |
| 2-methylbutyric acid | 1.14 | 0.0 |
| 1-hexanol | 0.15 | 1.88 |
| 4-heptanone | 1.52 | 0.0 |
| 2-heptanone | 32.83 | 43.6 |
| E5-2-heptenone | 5.6 | 4.06 |
| 2-acetyl-pyrroline | 0.12 | 1.03 |
| E3-2-heptenone | 2.3 | 2.15 |
| unknown | 0.39 | 2.12 |
| 6-methyl-3-heptanone | 6.39 | 4.44 |
| dimethyl trisulfide | 0.46 | 1.2 |
| 1-octen-3-ol | 1.68 | 2.46 |
| 3,4-dehydro-exo-7-ethyl-5-methyl-6.8-dioxabicyclo[3.2.1]octane | 2.84 | 7.4 |
| acetophenone | 1.64 | 3.61 |
| 2-sec-butyl-4,5-dihydrothiazole | 0.0 | 5.56 |
| 2,3,5-trithiahexane | 0.12 | 8.91 |
| 2-undecanone | 0.21 | 0.13 |
| trans-caryophyllene | 0.21 | 0.3 |
| geranylacetone | 0.24 | 0.69 |
| β-farnesene | 0.39 | 1.37 |
| α-humulene | 0.73 | 0.74 |

As depicted in Table 1, GC-MS analyses of headspace odorants emanating from urine- and feces-soiled bedding of mice revealed a variety of odorants comprising acids, ketones, alcohols, sesquiterpenes as well as sulfur- and nitrogen-containing compounds that varied greatly in relative abundance as well as between gender. Compared to headspace odorants of bedding soiled with urine and feces from female mice, three previously unidentified odorants were male-specific: 2,3,5-trithiahexane, 1-hexanol, and 3-methyl-2-pentanone (e.g., the CPCs).

To confirm that the CPCs increased in abundance as male mice progressed from juveniles to adults, regression models were fit to the day-to-day mean amounts of each of the three CPCs (2,3,5-trithiahexane, 1-hexanol, 3-methyl-2-pentanone) as well as the previously known pheromone components thiazole and brevicomin.

FIG. 1 depicts the regression models and illustrates the relative abundance of thiazole (a), brevicomin (b), 1-hexanol (c), 3-methyl-2-penatone (d), and 2,3,5-trithiahexane (e) in headspace odorant extracts of urine- and feces-soiled bedding from laboratory-kept male house mice, Mus musculus, progressing from 24 to 57 days of age, with each data point representing the mean and standard error of odorant extracts from three groups of 15 males each.

As depicted by FIG. 1, headspace odorants of 24- to 30-day-old M. musculus males contained the CPCs at levels barely above detection threshold of the mass spectrometer. The amounts of thiazole, one of the previously known pheromone components, were similarly low in juvenile males. As males progressed from 30 to 33 days of age, thiazole, 1-hexanol, and 3-methyl-2-pentanone all markedly increased in abundance (thiazole: $t=6.42$, $df=2$, $P=0.0235$; 1-hexanol: $t=13.46$, $df=2$, $P=0.0055$; 3-methyl-2-pentanone: $t=6.42$, $df=2$, $P=0.0227$). During the following 24 days (age 33-57), the amounts of these compounds remained relatively constant (slopes 0; thiazole: $F=0.50$, $P=0.50$; 1-hexanol: $F=0.90$, $P=0.37$; 3-methyl-2-pentanone: $F=0.46$, $P=0.51$).

Throughout the study period (days 24-57), the relative abundance of 2,3,5-trithiahexane and brevicomin did not differ significantly between juvenile males and adult males (2,3,5-trithiahexane: t=1.11, df=2, P=0.38; brevicomin: t=3.08, df=2, P=0.09y). Like the CPCs, brevicomin did increase markedly between days 30-33 but then decreased over the next 24 days (slope=−303.67, F=14.76, P=0.0056). Unlike other CPCs, 2,3,5-trithiahexane increased gradually in a sinusoidal manner.

At the end of the study, each of the CPCs was found to be 12 to 74 times more abundant in urine/feces headspace odorants of adult males than of adult female mice and increased in abundance as the mice progressed from juveniles to adolescents. (2,3,5-trithiahexane and mouse age was determined to be best presented by a non-linear sigmoid curve).

The increase in the abundance of the CPCs (2,3,5-trithiahexane, 1-hexanol, 3-methyl-2-pentanone) in headspace odorants as males progressed from juveniles to adults suggested that the CPCs could play an important role in pheromonal attraction of female mice.

Experiment 1: Laboratory Preference Test with Female Mice Comparing their Choice Between a Blend Comprising the CPCs, Brevicomin, Thiazole and Testosterone and a Blend Comprising Only Brevicomin, Thiazole and Testosterone.

Figure 2:
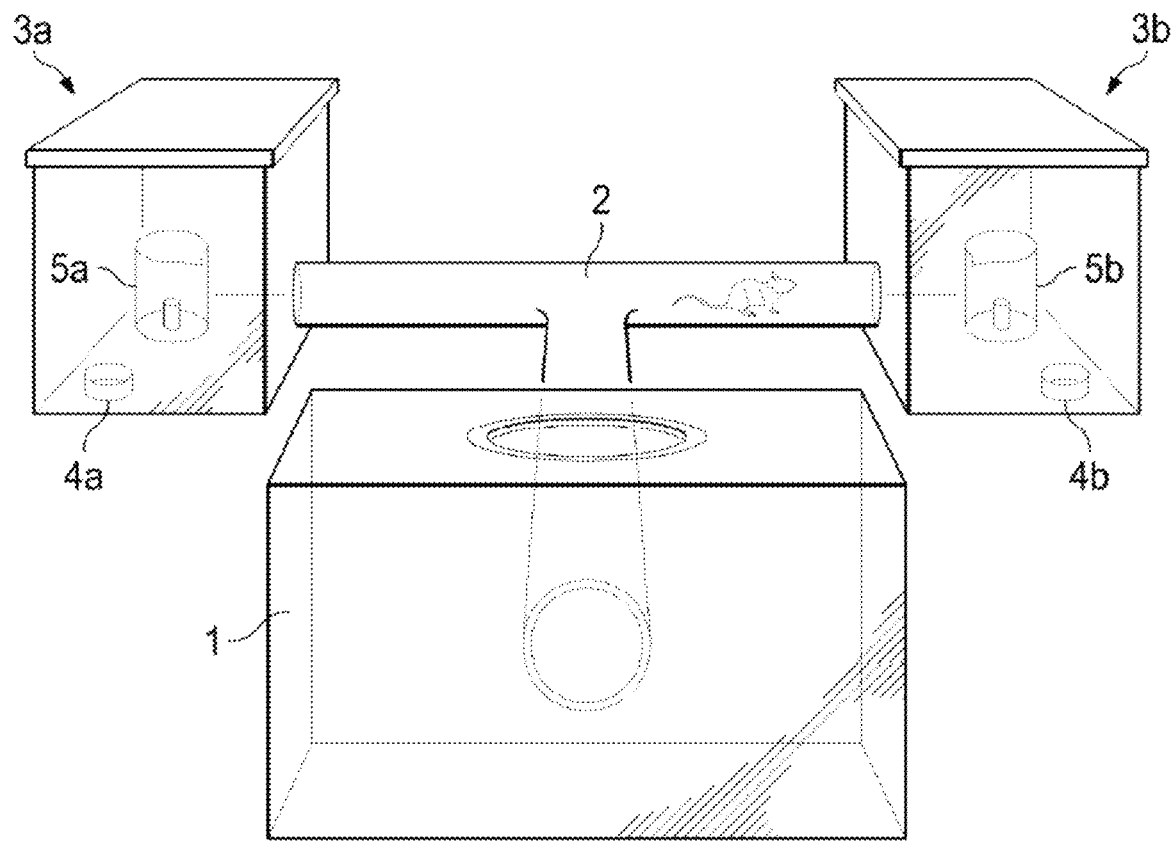
FIG. 2 depicts an illustration of an olfactometer to evaluate the first-choice preference of female mice to the attractant blends described herein versus a control.

To evaluate whether the CPCs synergistically improve the attractiveness of a blend comprising brevicomin, thiazole and testosterone, a laboratory two-choice experiment was performed. In this experiment, an olfactometer was used to determine the preference of singly-tested female mice for one of two odorant blends. The olfactometer is depicted in FIG. 2 and consisted of three clear Plexiglas chambers (1: 40 cm×20 cm×30 cm; 3a and 3b: each 60 cm×30 cm×40 cm) interconnected by a Pyrex glass T-tube (2; stem: 65 cm long, side arms: 45 cm long, all 10 cm in diameter).

For Experiment 1, both the treatment and control chambers (3a and 3b (randomly assigned)) were baited with (i) a piece of filter paper (Whatman #1, 120 mm, Maidstone, England, 01622) treated with testosterone (750 ng) dissolved in ether (50 µl) and (ii) a synthetic blend of brevicomin (1 mg) and thiazole (1 mg) formulated in mineral oil (10 ml) and contained in a 20-ml glass scintillation vial (VWR International, LLC Randor, PA 19087, USA). The randomly assigned treatment chamber in each replicate also received 700 µl of a CPC formulation [3-methyl-2-pentanone (0.3 mg), 1-hexanol (0.3 mg), and 2,3,5-trithiahexane (50 mg) in 100 ml of mineral oil] presented in a 0.5 dram glass scintillation vial. The amounts and ratios of the CPCs in this mineral oil formulation were carefully adjusted until they generated a headspace pheromone blend equivalent to that emanating from previously soiled bedding of one male mouse over the course of 24 h. The control chamber further contained a 0.5-dram glass scintillation vial filled with 700 µl of mineral oil. The scintillation vials for the treatment chamber and the control chamber were placed inside of a 600-ml beaker next to the testosterone-treated filter paper to prevent the female mouse from knocking over the vials.

For each 10-minute experimental run, the female mouse was allowed to enter the T-tube (2) and it was recorded whether the mouse with all 4 paws entered first the treatment chamber or the control chamber (3a or 3b). The results of Experiment 1 are depicted in FIG. 3.

Figure 3:
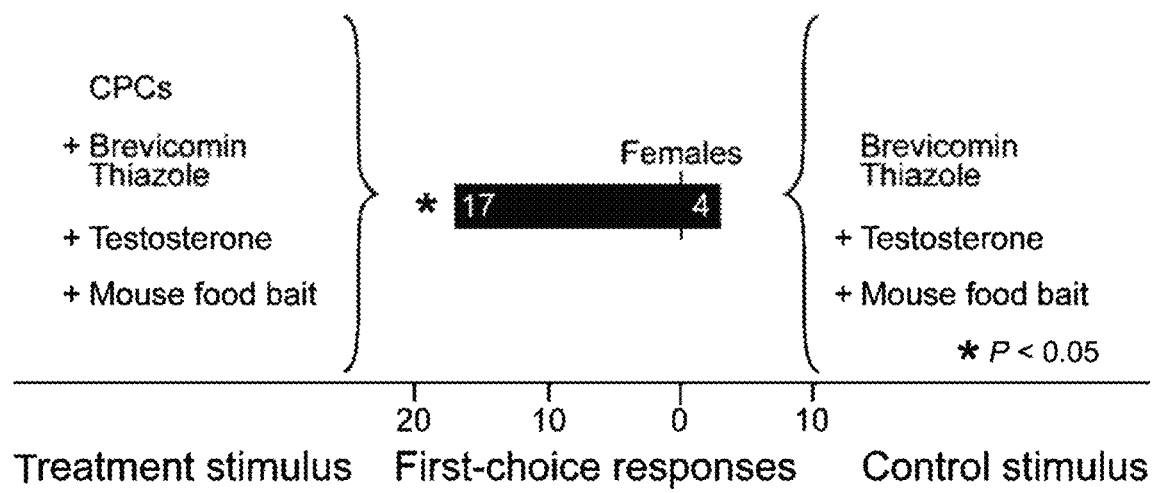
FIG. 3 depicts a graph illustrating the first-choice preference of female mice to enter into an experimental or control olfactometer chamber for Experiment 1.

As depicted in FIG. 3, 17 adult females entered first the treatment chamber baited with both the CPCs and the known attractants, whereas only four females entered first the control chamber baited with only the known attractants ($\chi^2$=8.85; P=0.0037), indicating a synergistic effect of the CPCs on pheromone blend attractiveness.

Experiment 2: Field Experiment Comparing Captures of Wild Mice in Paired Traps Baited with Either a Blend of the CPCs, Brevicomin, Thiazole and Testosterone or a Blend of Only Brevicomin, Thiazole and Testosterone.

The ability of the CPCs (2,3,5-trithiahexane, 1-hexanol, and 3-methyl-2-pentanone) to enhance the attractiveness of a blend of brevicomin, thiazole and testosterone as a trap lure was tested in a field experiment run in three locations in the Greater Vancouver area and the Lower Mainland of British Columbia during May 2018 to December 2018. Data were collected from wild house mice in field settings, rather than from laboratory-strain mice, because populations of wild mice are the targets in trapping programs.

Figure 4:
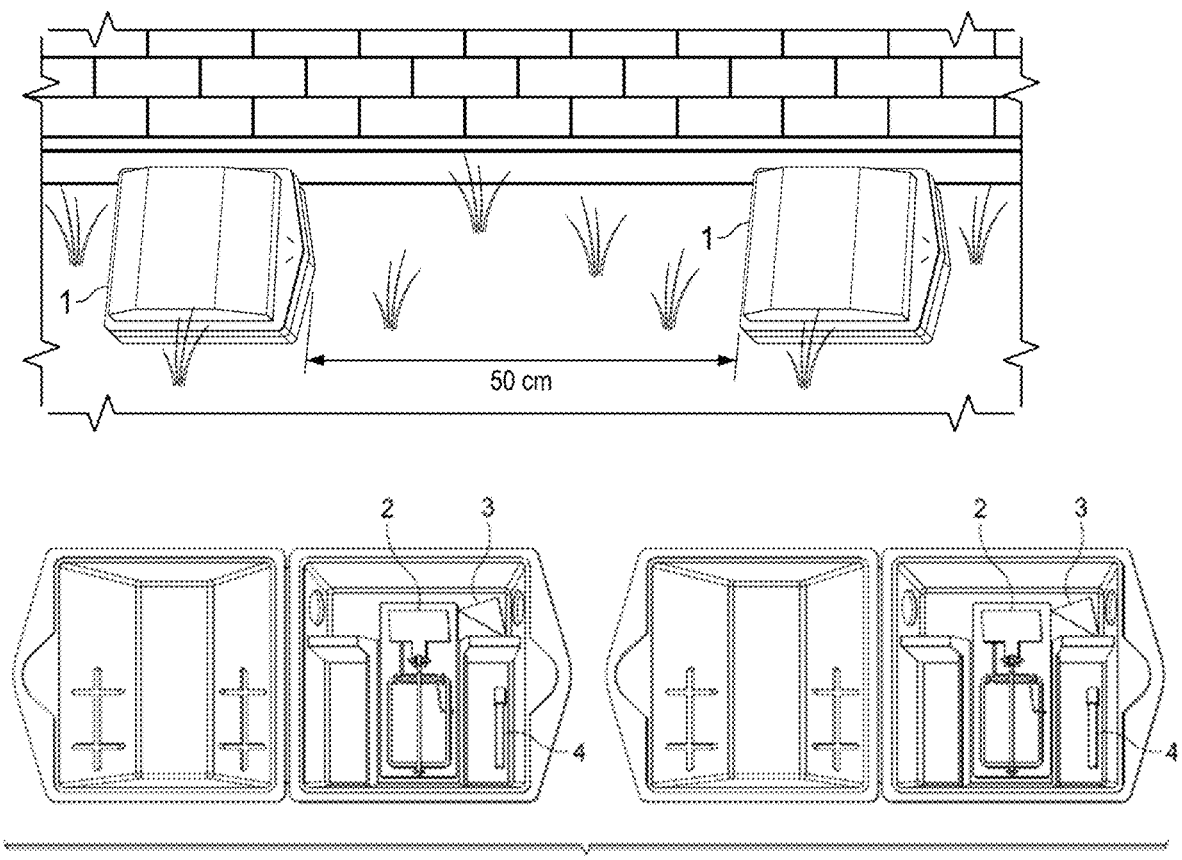
FIG. 4 depicts an illustration of the experimental design showing paired bait trap boxes for capturing wild mice in a field setting.

Each replicate (n=49) consisted of paired trap boxes as depicted in FIG. 4. The paired trap boxes, PROTECTA® Mouse, Bell Laboratories Inc. Madison, WI 53704, USA) were spaced 0.5-m apart and there was approximately 2 meters between pairs (not shown). As depicted in FIG. 4, each trap box, labeled 1, contained a snap trap (M325 M7 Pro mouse Woodstream Co., Lititz, PA 175543, USA), labeled 2, that was baited with the food bait described in PCT Patent App. No. PCT/CA2017/050498. Each of the trap boxes further included a triangular piece of filter paper, (Whatman #1, 120 mm, Maidstone, England, 01622), labeled 3, and a glass scintillation vial, labeled 4, that were treated with one of the blends of Experiment 1.

Twice every week, paired trap boxes were checked, and food lures and pheromone lures replaced. Whenever a mouse had been captured, its sex and age (juvenile or adult based on body size and genitalia development) were recorded, and a new trap box and snap trap were deployed. This procedure ensured that the odor of captured mice did not affect future captures. The position of the treatment and the control trap within paired trap boxes was re-randomized after each capture. Trap captures of female and male mice in Experiment 2 are depicted in FIG. 5.

Figure 5:
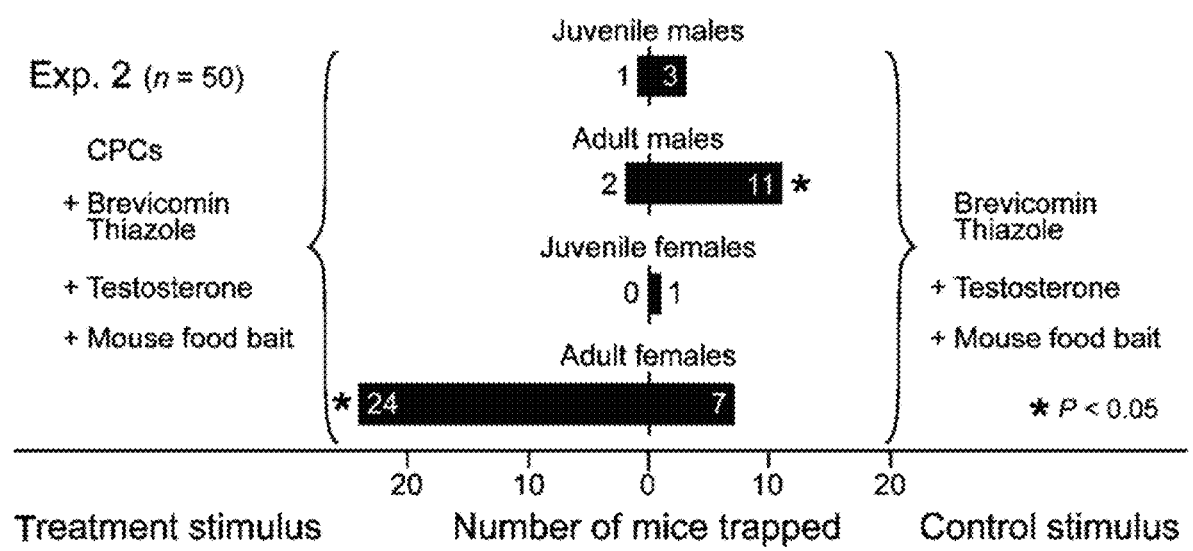
FIG. 5 depicts a graph illustrating the number of male and female mice captured in paired trap boxes baited with either an experimental attractant blend or a control blend for Experiment 2.

As depicted in FIG. 5, treatment boxes baited with both the CPCs and the known attractants captured 24 adult female mice, 3.4-times more than control boxes baited with just the known attractants ($\chi^2$=8.26; P=0.0041), indicating, that like Experiment 1, a synergistic improvement of the CPCs on pheromone blend attractiveness. Conversely, treatment boxes captured 5.5-times fewer adult males (2 vs 11) than control boxes ($\chi^2$=4.92, P=0.0265), revealing a deterrent effect of the CPCs on attraction of male mice. The capture proportion of adult males and adult females differed significantly ($\chi^2$=12.13, P=0.0005).

Experiments 3 and 4: Field Experiments Comparing Captures of Wild Mice in Paired Traps Baited with Testosterone Alone (Control Traps in Both Exps. 3 & 4) or Testosterone in Combination with Either Brevicomin and Thiazole (Treatment Traps in Exp. 3) or the CPCs (Treatment Traps in Exp. 4)

Experiments 3 and 4 evaluated the respective abilities of the CPCs and a blend of brevicomin and thiazole to enhance the attractiveness of testosterone. Experiments 3 and 4 were conducted in parallel in May to August of 2019 using the same general setup as described in Experiment 2 but with different blends of attractants. Specifically, in Experiment 3, the treatment box in each pair was baited with brevicomin (1 mg) and thiazole (1 mg) formulated in mineral oil (10 ml) and contained in a 20-ml glass scintillation vial. In Experiment 4, the treatment box in each pair was baited with 700 µl of the CPC formulation [3-methyl-2-pentanone (0.3 mg), 1-hexanol (0.3 mg), 2,3,5-trithiahexane (50 mg)] in mineral oil (100 ml)] pipetted into a 0.5-dram glass scintillation vial. To minimize any potential sources of error, treatment and control trap boxes in each experiment were fitted with the same glassware and volume of mineral oil. The results of Experiments 3 and 4 are depicted in FIG. 6.

Figure 6:
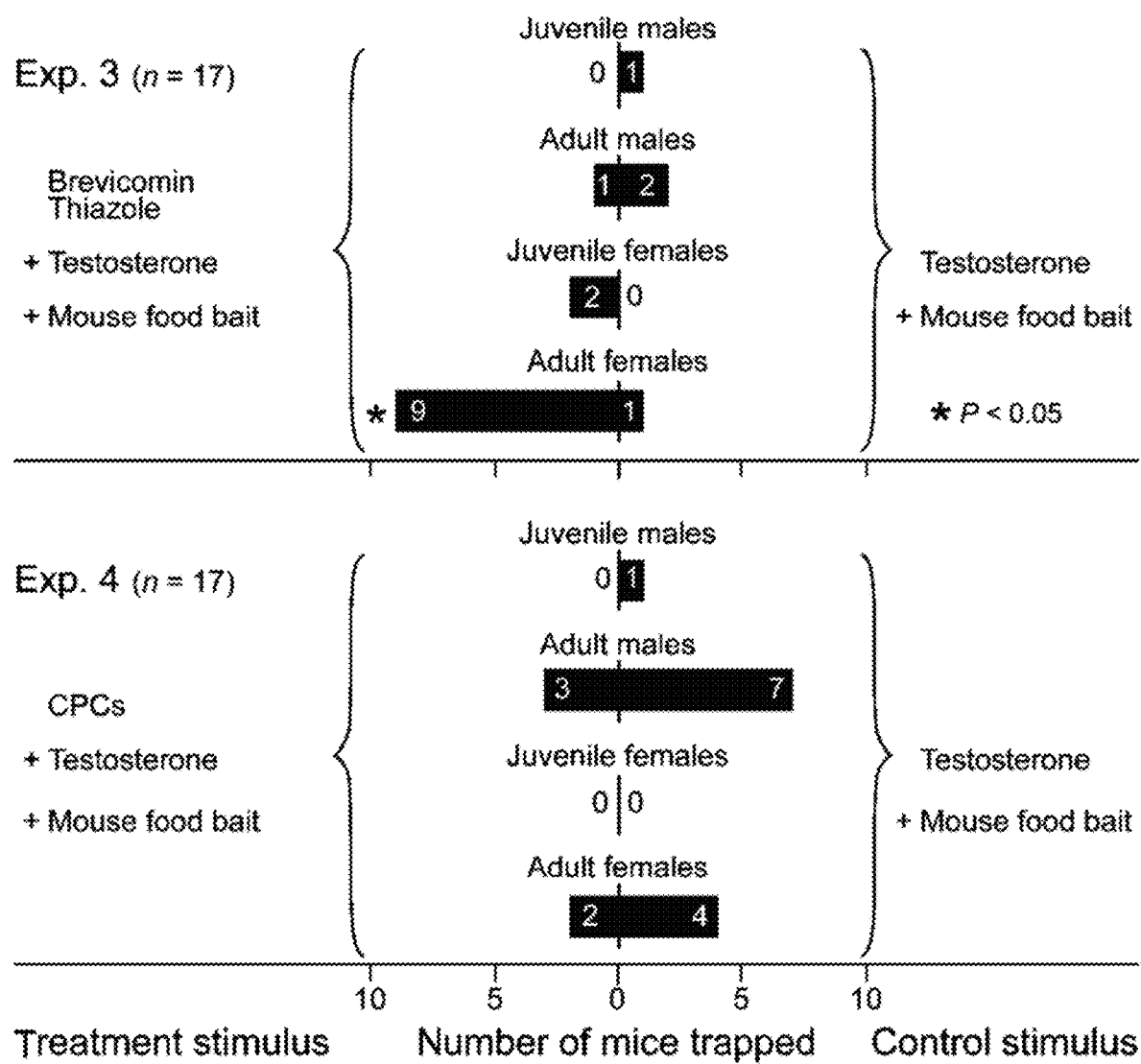
FIG. 6 depicts a graph illustrating the number of male and female mice captured in paired trap boxes baited with either an experimental attractant blend or a control blend for Experiments 3 and 4.

As depicted in FIG. 6, traps baited with brevicomin, thiazole and testosterone (Exp. 3) captured nine adult female mice, whereas traps baited with testosterone alone captured only one adult female ($\chi$=4.9, P=0.0269), confirming the pheromonal activity of brevicomin and thiazole in field settings. In parallel field Experiment 4, traps baited with the CPCs and testosterone captured two adult females and three adult males, whereas traps baited with testosterone alone captured four adult females ($\chi^2$=0, P=0.5), seven adult males ($\chi^2$=0.9, P=0.343), and one juvenile male. While no data set in Experiment 4 is statistically significant, there is evidence that the CPCs—even in the absence of brevicomin and thiazole—deter male mice.

Figure 7:
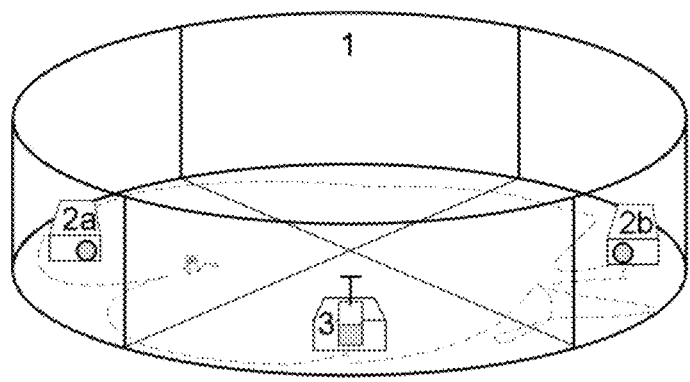
FIG. 7 depicts an illustration of the olfactometer arena used for testing first-choice entry of singly tested female mice into treatment or control trap boxes.

Experiments 5-8: Laboratory Preference Tests with Female Mice Comparing their Choice Between a Blend Comprising Brevicomin, Thiazole and Testosterone in Combination with all Three or any of Two CPCs, and a Blend Comprising Only Brevicomin, Thiazole and Testosterone With evidence that the three CPCs (2,3,5-trithiahexane, 1-hexanol, 3-methyl-2-pentanone) enhance the attractiveness of brevicomin, thiazole and testosterone as a trap lure in field settings (Experiment 5), experiments were run to determine whether an attractant blend formed of just two of the three CPCs could be effective. To this end, laboratory two-choice Experiments 5-8 were run. The experimental setup for Experiments 5-8 is depicted in FIG. 7, and consisted of a circular galvanized steel arena (1; 200×60 cm), two metal trap boxes (25×20×12 cm; 2a, 2b; Eaton & Co. Inc., Twinsburg, OH 44087, USA), and a transfer container (50×40×20 cm; 3) for release of the bioassay mouse. The arena was illuminated from above by a 7.5-W red bulb (Halco Lighting Technologies, Norcross, GA 30071, USA) to facilitate video recordings and observations of the mouse's position.

For Experiments 5-8, both the treatment and the control trap box (2a and 2b in FIG. 7) were baited with (i) a piece of filter paper (Watman #1, 120 mm) treated with testosterone (750 ng) dissolved in acetonitrile (50 μl) and (ii) a synthetic blend of brevicomin (1,317 ng) and thiazole (989 ng) formulated in hexane/ether (50 μl). In Experiment 5, the randomly assigned treatment chamber in each replicate also received the 3 CPCs [3-methyl-2-pentanone (58 ng), 1-hexanol (334 ng), 2,3,5-trithiahexane (1,585 ng)] dissolved in hexane/ether (50 μL) and pipetted onto filter paper. The amounts of test chemicals were equivalent to those emanating from previously soiled bedding of one male mouse over the course of 24 hours. Each of Experiments 6-8 was identical in design except that only two of the three CPCs were tested, as follows: Exp. 6: 2,3,5-trithiahexane and 1-hexanol; Exp. 7: 3-methyl-2-pentanone and 1-hexanol; and Exp. 8: 3-methyl-2-pentanone and 2,3,5-trithiahexane.

For each replicate in each of Experiments 5-8, a single female mouse was removed from her "home" cage in Animal Care and placed into the transfer container for transportation to the bioassay arena. The transfer container was positioned in the arena equidistant to the two trap boxes and 4-6 cm from the arena wall, with the opening of the container facing the arena wall. For each bioassay, the female mouse was allowed to leave the transfer container on her own accord, and the trap box she entered first within 10 min was recorded as the response criterion. The results of Experiments 5-8 are depicted in FIG. 8.

Figure 8:
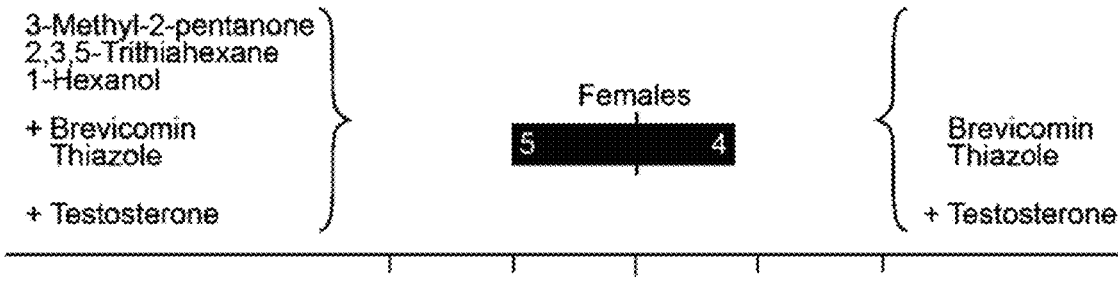
FIG. 8 depicts a series of graphs illustrating the number of female mice that first entered treatment or control trap boxes in Experiments 5-8.
Figure 8:
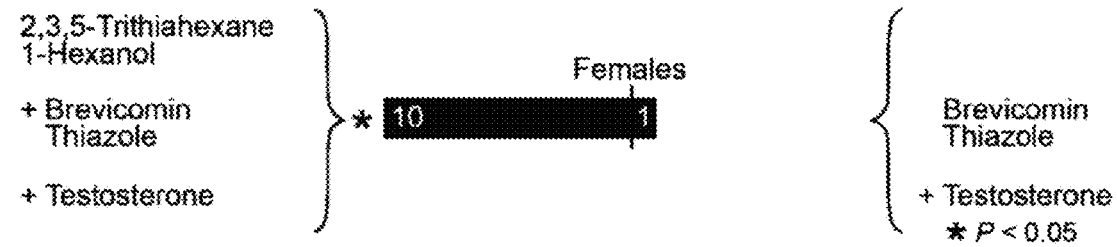
Figure 8:
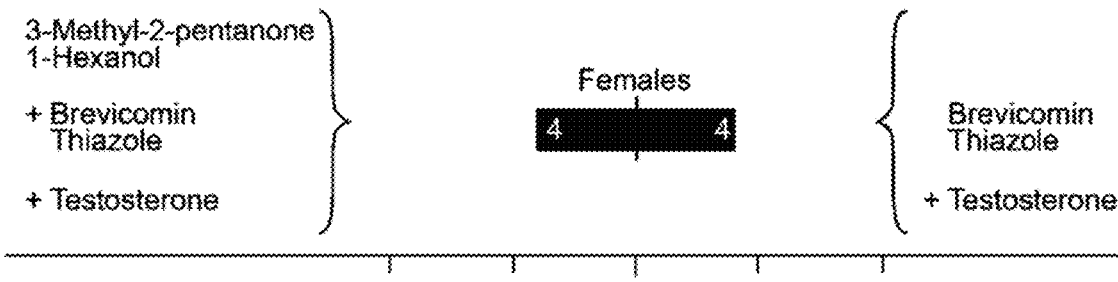
Figure 8:
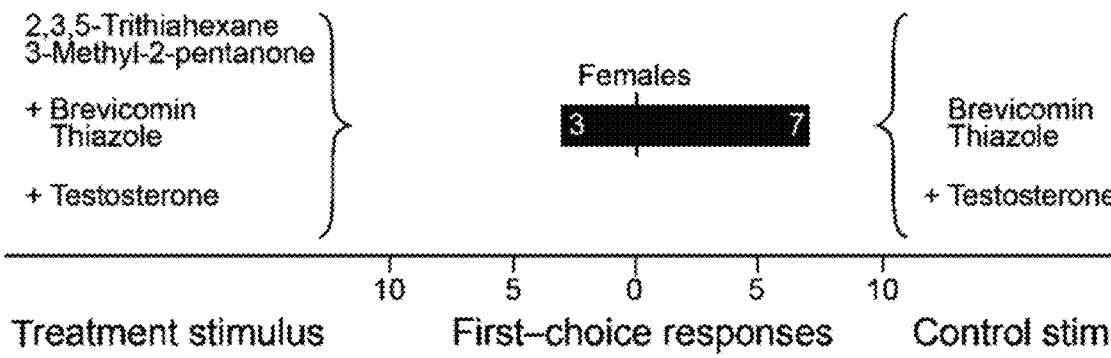

As depicted in FIG. 8, in Experiment 5 [that tested the effect of all three CPCs (3-methyl-2-pentanone; 1-hexanol; 2,3,5-trithiahexane)], 5 and 4 females entered first the treatment box and the control box, respectively (p>0.05). In Experiment 6 [that tested the effect of two CPCs (2,3,5-trithiahexane; 1-hexanol)], 10 females and 1 female entered first the treatment box and the control box, respectively ($\chi^2$ with Yates correction: 5.18, p=0.016). In Experiment 7 [that tested the effect of two other CPCs (3-methyl-2-pentanone; 1-hexanol)], 4 females each enter first the treatment box and the control box (p>0.05). In Experiment 8 (that tested the effect of yet two other CPCs (3-methyl-2-pentanone; 2,3,5-trithiahexane)], 3 and 7 females entered first the treatment box and the control box, respectively (p>0.05). The data of Experiments 5-8 in combination reveal that 2,3,5-trithiahexane and 1-hexanol can alone have a strong effect on attraction of female mice.

Experiment 9: Field Experiment Comparing Captures of Wild Mice in Paired Traps Baited with Either a Blend of Two CPCs (2,3,5-Trithiahexane, 1-Hexanol), Brevicomin, Thiazole and Testosterone or a Blend of Only Brevicomin, Thiazole and Testosterone.

The ability of the CPCs 2,3,5-trithiahexane and 1-hexanol to enhance the attractiveness of the blend of brevicomin, thiazole and testosterone as a trap lure was tested in a field experiment (Experiment 9) run in 4 locations in the Greater Vancouver area and the Lower Mainland of British Columbia during March 2021 to August 2021. The same general design was used as described for Experiment 2 and depicted in FIG. 4. Each replicate (n=11) consisted of paired trap boxes that were spaced 0.5 m apart. As depicted in FIG. 4, each trap box, labelled 1, contained a snap trap, labelled 2, that was baited with a food bait described in PCT Patent Appl. No. PCT/CA2017/050498. Both trap boxes in each pair were baited with (i) a piece of filter paper, treated with testosterone (750 ng) dissolved in acetonitrile (50 μl) and (ii) a synthetic blend of brevicomin (1 mg) and thiazole (1 mg) formulated in mineral oil (10 ml) and contained in a 20-ml glass scintillation vial. The randomly assigned treatment box in each pair was also baited with 700 μl of the 2-component CPC formulation [1-hexanol (0.3 mg), 2,3,5-trithiahexane (50 mg) in mineral oil (100 ml) pipetted into a 0.5-ml glass scintillation vial]. To minimize any potential sources of error, treatment and control trap boxes were fitted with the same glassware and volume of mineral oil.

Twice every week, paired trap boxes were checked, and once per week food and pheromone lures were replaced. Whenever a mouse had been captured, its sex was recorded, and a new trap box and snap trap were deployed, re-randomizing the position of the treatment and the control box. Trap captures of Experiment 9 are depicted in FIG. 9.

Figure 9:
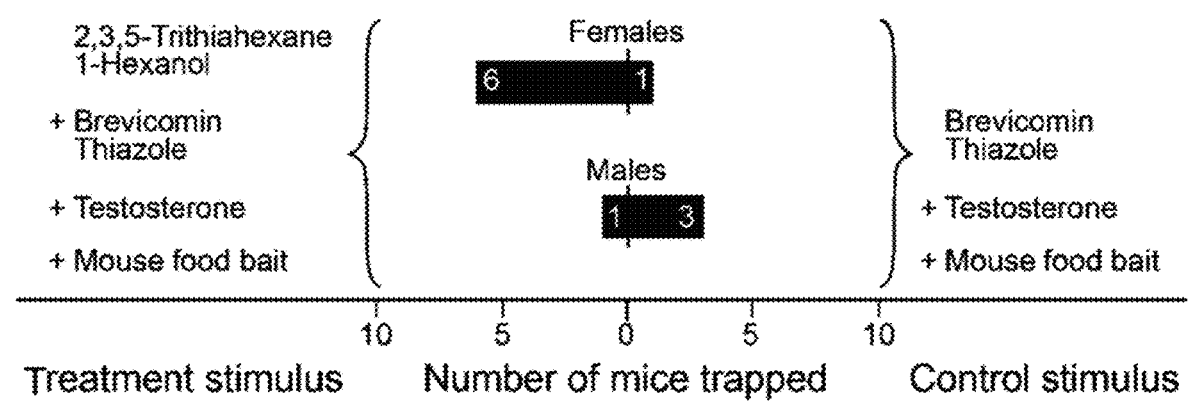
FIG. 9 depicts a graph illustrating the number of female and male house mice captured in paired trap boxes baited with either an experimental blend or a control blend in Experiment 9.

As depicted in FIG. 9, treatment boxes baited with the CPCs 2,3,5-trithiahexane and 1-hexanol and with the known pheromone components brevicomin, thiazole and testosterone captured 6 female house mice and 1 male house mouse, whereas control boxes baited only with the known pheromone components captured 1 female and 3 male house mice. These data reveal that the two CPCs enhance attraction and captures of female house mice 6-fold.

The following documents are hereby incorporated by reference in their entireties: Brigham, A. J. and R. M. Sibly, A review of the phenomenon of neophobia (1999); Beny Y, Kimchi T (2014) Innate and learned aspects of pheromone-mediated social behaviours. Anim Behav 97:301-311; Hurst J L, Robertson D H L, Tolladay U, Beynon R J (1998) Proteins in urine scent marks of male house mice extend the longevity of olfactory signals. Anim Behav 55:1289-1297;

Jemiolo B, Harvey S, Novotny M (1986) Promotion of the Whitten effect in female mice by synthetic analogs of male urinary constituents. Proc Natl Acad Sci USA 83:4576-4579; Liebich H M, Zlatkis A, Bertsch W, Van Dahm E, Whitten W K (1977) Identification of dihydrothiazoles in urine of male mice. Biol Mass Spectrom 4:69-72; Mucignat-Caretta C (2002) Modulation of exploratory behavior in female mice by protein-borne male urinary molecules. J Chem Ecol 28:1853-1863; Mucignat-Caretta C, Caretta A (1999) Chemical signals in male house mice urine: protein-bound molecules modulate interactions between sexes. Behaviour 136:331-343; and Novotny M V (2003) Pheromones, binding proteins and receptor responses in rodents. Biochem Soc Trans 31(Pt 1):117-122.

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the composition in a dispersion medium (e.g., water); and "dry" refers to the relative percentages of the dry composition prior to the addition of the dispersion medium. In other words, the dry percentages are those present without taking the dispersion medium into account. Wet admixture refers to the composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or patent application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather, it is hereby intended the scope be defined by the claims appended hereto.

What is claimed is:

1. An attractant blend composition for attracting female mice, the composition comprising:
    one or more pheromone components comprising one or more of 2,3,5-trithiahexane and 1-hexanol; and
    one or more female mouse attractants comprising one or more of 3,4-dehydro-exo-7-ethyl-5-methyl-6.8-dioxabicyclo[3.2.1]octane ("brevicomin"), 2-sec-butyl-4,5-dihydrothiazole ("thiazole"), and testosterone; and
    wherein the one or more pheromone components and the one or more female mouse attractants are isolated, synthetic, or purified; and
    wherein the attractant blend composition does not include 3-methyl-2-pentanone.

2. The attractant blend composition of claim 1 comprises each of brevicomin, thiazole, and testosterone.

3. The attractant blend composition of claim 1 emanates each of the one or more pheromone components and one or more female mouse attractant compounds in an amount substantially similar to the amount emanating from the soiled bedding of one male mouse over a period of 24 hours.

4. The attractant blend composition of claim 1 comprises about 0.1 mg to about 0.5 mg of 1-hexanol and about 5 mg to 100 mg of 2,3,5-trithiahexane in about 80 to about 120 mL of mineral oil.

5. The attractant blend composition of claim 1 comprises about 0.3 mg of 1-hexanol, and about 50 mg of 2,3,5-trithiahexane in about 90 mL to about 110 mL of mineral oil.

6. The attractant blend composition of claim 1 comprises about 100 ng to about 1500 ng of testosterone, about 0.01 mg to about 5 mg of brevicomin and about 0.01 mg to about 5 mg of thiazole, wherein the brevicomin and thiazole are dispersed in about 5 mL to about 15 mL of mineral oil.

7. The attractant blend composition of claim 1, wherein the testosterone is dissolved in ether and applied onto filter paper.

8. The attractant blend composition of claim 1, wherein the one or more pheromone components emanate into air from a first location and the one or more female mouse attractants emanate into air from at least a second location.

9. The attractant blend composition of claim 1, further comprising a lethal agent.

10. The attractant blend composition of claim 9 comprises a dose of the lethal agent sufficient to kill or immobilize a mouse.

11. The attractant blend composition of claim 10, wherein the lethal agent comprises a chemical capable of killing or immobilizing a mouse.

12. The attractant blend composition of claim 11, wherein the chemical comprises one or more of an anticoagulant and a toxicant.

13. The attractant blend composition of claim 12, wherein the anticoagulant comprises one or more of warfarin ((RS)-4-hydroxy-3-(3-oxo-1-phenylbutyl)-2H-chromen-2-one), chlorophacinone (2-[2-(4-chlorophenyl)-1-oxo-2-phenyl ethyl]indane-1,3-di one), diphacinone (2-(diphenylacetyl)-1H-indene-1,3(2H)-dione), bromadiolone (3-[3-[4-(4-bromophenyl)phenyl]-3-hydroxy-1-phenylpropyl]-2-hydroxy-chromen-4-one), difethialone (3-[3-[4-(4-bromophenyl)phenyl]-1-tetralinyl]-2-hydroxy-4-thiochromenone), and brodifacoum (3-[3-[4-(4-bromophenyl)phenyl]-1,2,3,4-tetrahydronaphthalen-1-yl]-2-hydroxychromen-4-one).

14. The attractant blend composition of claim 12, wherein the toxicant comprises one or more of bromethalin (N-methyl-2,4-dinitro-6-(trifluoromethyl)-N-(2',4',6'-tribromophenyl)aniline), cholecalciferol ((3β,5Z,7E)-9, 10-secocholesta-5,7, 10(19)-trien-3-ol), zinc phosphide (zinc phosphide/trizinc diphosphide), and strychnine (strychnidin-10-one).

15. The attractant blend composition of claim 1 is a granule, a powder, a solid block, a gel, a paste, a liquid, or a combination thereof.

16. A food bait comprising the attractant blend composition of claim 1.

17. The food bait of claim 16 comprises one or more of meat, cheese, eggs, nuts, bacon, one or more grains, lard and cracklings, cereal flour, cereal bran, gelling agent, sugar, oil, emulsifier, a humectant, water, and one or more synthetic food odorants.

18. A method of attracting a female mouse, the method comprising:
    providing a composition comprising:
        one or more pheromone components comprising one or more of 2,3,5-trithiahexane and 1-hexanol; and
        one or more female mouse attractants comprising one or more of 3,4-dehydro-exo-7-ethyl-5-methyl-6,8-dioxabicyclo[3.2.1] octane ("brevicomin"), 2-sec-butyl-4,5-dihydrothiazole ("thiazole"), and testosterone; and
    wherein the one or more pheromone components and the one or more female mouse attractants are isolated, synthetic, or purified; and
    wherein the attractant blend composition does not include 3-methyl-2-pentanone.

19. A device for attracting a female mouse, the device comprising:
    a housing or a trap; and
    an attractant blend composition comprising:
        one or more pheromone components comprising one or more of 2,3,5-trithiahexane and 1-hexanol; and
        one or more female mouse attractants comprising one or more of 3,4-dehydro-exo-7-ethyl-5-methyl-6,8-dioxabicyclo[3.2.1]octane ("brevicomin"), 2-sec-butyl-4,5-dihydrothiazole ("thiazole"), and testosterone; and
    wherein the one or more pheromone components and the one or more female mouse attractants are isolated, synthetic, or purified;
    wherein the attractant blend composition does not include 3-methyl-2-pentanone; and
    wherein the attractant blend composition is adjacent to, or included within, the housing or the trap.

* * * * *